Patented June 25, 1940

2,205,393

UNITED STATES PATENT OFFICE 2,205,393

(HALO-PHENOXY)-HALO-DIALKYL ETHERS

Gerald H. Coleman and Clarence L. Moyle, Midland, Mich., assignors to The Dow Chemical Company, Midland, Mich., a corporation of Michigan No Drawing. Application August 17, 1938,
Serial No. 225,415

8 Claims. (Cl. 260—613)

This invention concerns the (halo-phenoxy)-halo-dialkyl ethers and particularly those compounds having the formula

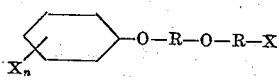

wherein each R represents an alkylene radical containing not more than 3 carbon atoms, each X represents halogen, and $n$ represents an integer not greater than 5.

We have prepared and identified a number of compounds falling under the above formula, and found them to be viscous liquids or low-melting solids substantially non-toxic to humans and particularly adapted for use as insecticidal toxicants.

Our new compounds are conveniently prepared by reacting together a halo-phenol and a dihalo-lower dialkyl ether in the presence of aqueous alkali. For example, in preparing the beta-(halo-phenoxy)-beta'-chloro-diethyl ethers, a mixture of a halo-phenol, beta-beta'-dichloro-ether, sodium hydroxide, and water is heated to a temperature at which reaction takes place. Regardless of the proportions of phenol and dichloro-ether employed in the reaction, a mixture of the desired compound and beta-beta'-diaryloxy-diethyl ether is formed. In order that the mono-chloro-ether compound be obtained in high yield, an excess of the beta-beta'-dichloro-diethyl ether is preferably employed. While the reaction may be carried out at any suitable temperature, it is convenient to operate at the boiling temperature of the mixture, under reflux, and at atmospheric pressure. The time required for carrying out the reaction can be somewhat reduced by operating at higher temperatures and under autogenous pressure. Following completion of the reaction, the mixture is cooled and the desired ether compounds separated therefrom, as by extraction and fractional distillation.

The following examples describe in detail the preparation of certain individual members of our new class of compounds, but are not to be construed as limiting the invention.

Example 1

128.5 grams (1 mol) of 2-chloro-phenol, 215 grams (1.5 mols) of beta-beta'-dichloro-diethyl ether, 40 grams (1 mol) of sodium hydroxide, and 100 grams (5.5 mols) of water were mixed together and heated at 108° C. under reflux for 10.5 hours. The reaction mixture was then cooled to room temperature and the water-immiscible layer separated by decantation. This product was washed with water, dried, and fractionally distilled under reduced pressure, whereby there was obtained 181 grams of a high-boiling ether product. This product was refractionated to obtain beta-(2-chloro-phenoxy)-beta'-chloro-diethyl ether as a water-white, viscous liquid boiling at 135° to 136° C. at 2 millimeters pressure, and having a specific gravity of 1.252 at 20°/4° C.

Example 2

0.75 mol each of 2,4,6-trichloro-phenol and sodium hydroxide were mixed with 1 mol of beta-beta'-dichloro-diethyl ether and 200 grams of water, and refluxed at 102° C. for 30 hours. Upon cooling, separation of the mixed ether products, and fractional distillation, there was obtained 175 grams of the desired mono-chloro-ether product. This material was refractionated, whereby there was obtained substantially pure beta-(2.4.6-trichloro-phenoxy)-beta'-chloro-diethyl ether as a colorless, viscous liquid boiling at 168° to 170° C. at 4 millimeters pressure, and having the specific gravity 1.412 at 20°/4° C.

Example 3

Two molar quantities of 2,4-dibromo-phenol was reacted with 4 mols of beta-beta'-dichloro-diethyl ether in the presence of 2 mols of 20 per cent aqueous sodium hydroxide. The reaction was carried out at the boiling temperature of the mixture under reflux for 20 hours, the product thereafter being cooled, the water-immiscible ether layer separated, washed with water, and dried. Upon fractional distillation of this ether layer, there was obtained beta-(2,4-dibromo-phenoxy)-beta'-chloro-diethyl ether as a colorless, mobile liquid boiling at 196° to 201° C. at 6 millimeters pressure and having the density 1.728 at 25°/25° C.

Other halo-phenols were substituted for those shown in the examples and reacted with the di-halo-dialkyl ethers in a similar manner. Representative of the products obtained are the following:

Beta-(4-chloro-phenoxy)-beta'-chloro-diethyl ether, a liquid boiling at 156° to 159° C. at 3 millimeters pressure and having the specific gravity 1.250 at 20°/4° C.

Beta-(2,4-dichloro-phenoxy)-beta'-chloro-diethyl ether, a liquid boiling at 148° to 149° C. at 1.5 millimeters pressure and having the specific gravity 1.347 at 20°/4° C.

Beta-(2,4,5-trichloro-phenoxy)-beta'-chlorodiethyl ether, a white, crystalline solid boiling between 189° and 198° C. at 7 to 8 millimeters pressure, and melting at approximately 60° C.

Beta-(4-bromo-2,6-dichloro-phenoxy)-beta'-chloro-diethyl ether, a liquid boiling at 191° to 201° C. at 7–8 millimeters pressure and having the density 1.596 at 25°/25° C.

Beta-(2-bromo-4-chloro-phenoxy)-beta'-chloro-diethyl ether, a liquid boiling at 183° to 190° C. at 6 millimeters pressure and having the density 1.536 at 25°/25° C.

Beta-(2-bromo-4,6-dichloro-phenoxy)-beta'-chloro-diethyl ether, a liquid boiling at 186° to 194° C. at 6 millimeters pressure and having the density 1.584 at 25°/25° C.

Similar ether compounds which may be prepared substantially as described in Example 1 from the halo-phenols and such dihalo-dialkyl ethers as beta-beta'-dibromo-diethyl ether, beta-chloro-beta'-bromo-diethyl ether, beta-gamma'-dichloro-ethyl-propyl ether, beta-beta'-di-iodo-diethyl ether, beta-beta'-dichloro-dipropyl ether, gamma-gamma'-dibromo-dipropyl ether, and the like include: beta-(2,4,6-trichloro-phenoxy)-beta'-bromo-diethyl ether, beta-(2,4,6-tribromo-phenoxy)-beta'-chloro-diethyl ether, beta-(2,4,5,6-tetra-chloro-phenoxy)-beta'-chloro-diethyl ether, beta-(pentachloro-phenoxy)-beta'-chloro-diethyl ether, beta-(2-bromo-phenoxy)-beta'-chloro-diethyl ether, beta-(4-iodo-phenoxy)-beta'-bromo-diethyl ether, beta-(2,4,6-trichloro-phenoxy)-beta'-chloro-diethyl ether, beta-(2,4,6-trichloro-phenoxy)-beta'-choro-ethyl-propyl ether, beta-(2,4-dichloro-phenoxy)-gamma'-chloro-dipropyl ether, etc.

Petroleum distillate solutions of the (halo-phenoxy)-halo-dialkyl ethers have been found of value as fly spray materials. For example, a 3 per cent solution of beta-(2,4,6-trichloro-phenoxy)-beta'-chloro-diethyl ether in kerosene, when tested by the Peet-Grady method, substantially as described in Soap, 8, No. 4, 1932, was found to give better than a 92 per cent knockdown in 10 minutes and to kill 66 per cent of three-day old flies in 48 hours. Beta-(2-bromo-4-chloro-phenoxy)-beta'-chloro-diethyl ether and beta-(2,4-dibromo-phenoxy)-beta'-chloro-diethyl ether, when similarly tested, gave knockdowns of 74 and 90 per cent in 10 minutes and kills of 46 and 54 per cent, respectively, of the test insects in 48 hours.

We claim:

1. A compound having the formula

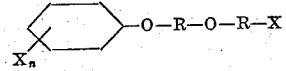

wherein each R represents an alkylene radical containing not more than 3 carbon atoms, each X represents halogen, and $n$ represents an integer not greater than 5.

2. A compound having the formula

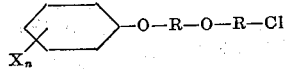

wherein each R represents an alkylene radical containing not more than 3 carbon atoms, X represents halogen, and $n$ represents an integer not greater than 5.

3. A compound having the formula

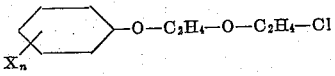

wherein X represents halogen and $n$ represents an integer not greater than 5.

4. A compound having the formula

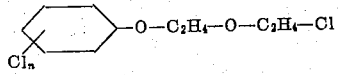

wherein $n$ represents an integer not greater than 5.

5. A compound having the formula

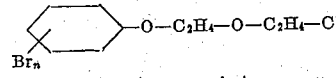

wherein $n$ represents an integer not greater than 5.

6. Beta-(2,4,6-trichloro-phenoxy)-beta'-chloro-diethyl ether.

7. Beta-(4-bromo-2,6-dichloro-phenoxy)-beta'-chloro-diethyl ether.

8. Beta-(2-bromo-4,6-dichloro-phenoxy)-beta'-chloro-diethyl ether.

GERALD H. COLEMAN.
CLARENCE L. MOYLE.